United States Patent [19]
Shirasawa et al.

[11] Patent Number: 5,036,720
[45] Date of Patent: Aug. 6, 1991

[54] SCREW-NUT FEED MECHANISM

[75] Inventors: Hiro Shirasawa; Shigeru Hoshino, both of Toyota, Japan

[73] Assignee: Toyota Jidosha Kabushiki Kaisha, Toyota, Japan

[21] Appl. No.: 410,523

[22] Filed: Sep. 22, 1989

[30] Foreign Application Priority Data

Sep. 22, 1988 [JP] Japan .................. 63-124034[U]

[51] Int. Cl.$^5$ ................ F16H 25/24; B62D 1/18
[52] U.S. Cl. .................. 74/441; 74/89.15; 74/493
[58] Field of Search ........ 74/89.15, 424.8 R, 424.8 A, 74/441, 493

[56] References Cited

U.S. PATENT DOCUMENTS

| | | | |
|---|---|---|---|
| 109,348 | 11/1870 | Ross et al. | 74/441 |
| 1,955,954 | 4/1934 | Dumser | 74/441 X |
| 2,389,035 | 11/1945 | Feeney | 74/441 |
| 2,642,669 | 6/1953 | Ernst | 74/441 X |
| 3,080,794 | 3/1963 | Grabes | 74/441 X |
| 3,703,835 | 11/1972 | O'Connor et al. | 74/424.8 A |
| 3,975,968 | 8/1976 | Chaffin | 74/424.8 R |
| 4,602,520 | 7/1986 | Nishikawa et al. | 74/493 |
| 4,679,457 | 7/1987 | Nishikawa et al. | 74/441 |
| 4,753,122 | 6/1988 | Nishikawa et al. | 74/441 X |

FOREIGN PATENT DOCUMENTS 60-182278  12/1985  Japan .

*Primary Examiner*—Allan D. Herrmann
*Attorney, Agent, or Firm*—Cushman, Darby & Cushman

[57] ABSTRACT

A screw-nut feed mechanism for effecting axial displacement of a movable member on a stationary member in accordance with rotation of a feed screw shaft mounted on the stationary member. The feed mechanism includes a first nut element threadedly mounted on the screw shaft and being connected to the movable member for axial movement therewith, the first nut element having internal threads in engagement with external threads of the screw shaft, a second nut element threadedly mounted on the screw shaft, the second nut element having internal threads in engagement with the external thread of the screw shaft and being fastened to the first nut element in such a manner that the screw shaft is applied with a pre-load in an axial direction to eliminate all of the clearance space between the threads of the screw shaft and the first nut element, and a support element coupled with the second nut element and being fastened to the first nut element to retain the connection of the first and second nut elements.

5 Claims, 6 Drawing Sheets

SCREW-NUT FEED MECHANISM

BACKGROUND OF THE INVENTION

1. Field of the Invention

The present invention relates to a screw-nut feed mechanism, and more particularly to a screw-nut feed mechanism suitable for use in a telescopically adjustable steering column mechanism for motor vehicles.

2. Description of the Prior Art

In Japanese Utility Model Early Publication 60-182278, there has been proposed a telescopically adjustable steering column mechanism of the motor drive type which includes an outer hollow steering shaft rotatably carried on a stationary structure, an inner tubular steering shaft axially slidably disposed in the outer steering shaft for rotation therewith, a telescopic shaft rotatably disposed in the inner steering shaft for axial movement therewith, and a feed screw shaft having one end connected to the outer steering shaft and an externally threaded portion in engagement with an internally threaded portion of the telescopic shaft. In the steering column mechanism, a conical member is axially slidably coupled with the feed screw shaft and threaded into the inner end of the inner steering shaft. The conical member acts to eliminate an annular space between the outer and inner steering shafts during rotation of the telescopic shaft but does not effect to minimize or eliminate clearance spaces between the mating threads. To minimize or eliminate all of the clearance spaces between the mating threads, the respective threaded portions of the shafts must be formed with a very high degree of accuracy. This results in an increase of the production cost of the steering mechanism.

SUMMARY OF THE INVENTION

It is, therefore, a primary object of the present invention to provide an improved screw-nut feed mechanism capable of minimizing all of the clearance spaces between the nut and screw threads in a simple construction with a small number of component parts.

A secondary object of the present invention is to provide an improved screw-nut feed mechanism suitable for use in a telescopically adjustable steering column mechanism of the motor drive at a low cost.

According to the present invention, the objects are accomplished by a screw-nut feed mechanism for effecting axial displacement of a movable member on a stationary member in accordance with rotation of a feed screw shaft mounted on the stationary member, which feed mechanism comprises a first nut element threadedly mounted on the feed screw shaft and being connected to the movable member for axial movement therewith, the first nut element having internal threads in engagement with external threads of the feed screw shaft, a second nut element threadedly mounted on the feed screw shaft, the second nut element having internal threads in engagement with the external threads of the feed screw shaft and being fastened to the first nut element in such a manner that the feed screw shaft is applied with a pre-load in an axial direction to eliminate all of the clearance space between the threads of the feed screw shaft and the first nut element, and means for retaining the connection of the first and second nut elements.

In another aspect of the present invention, there is provided a screw-nut feed mechanism which comprises a first tapered nut element threadedly mounted on a feed screw shaft, the first nut element having internal threads in engagement with external threads of the feed screw shaft, a second nut element threadedly coupled with the first nut element and being connected to a movable member on a stationary member for axial movement therewith, the second nut element having a tapered bore formed with internal threads in engagement with external threads of the first nut element and being fastened to the first nut element in such a manner that the feed screw shaft is applied with a pre-load in a radial direction to eliminate all of the clearance space between the threads of the feed screw shaft and the first nut element, and means for retaining the connection of the first and second nut elements.

BRIEF DESCRIPTION OF THE DRAWINGS

Other objects, features and advantages of the present invention will be readily appreciated from the following detailed description of preferred embodiments thereof when taken together with the accompanying drawings, in which.

DESCRIPTION OF THE PREFERRED EMBODIMENTS

Figure 1:
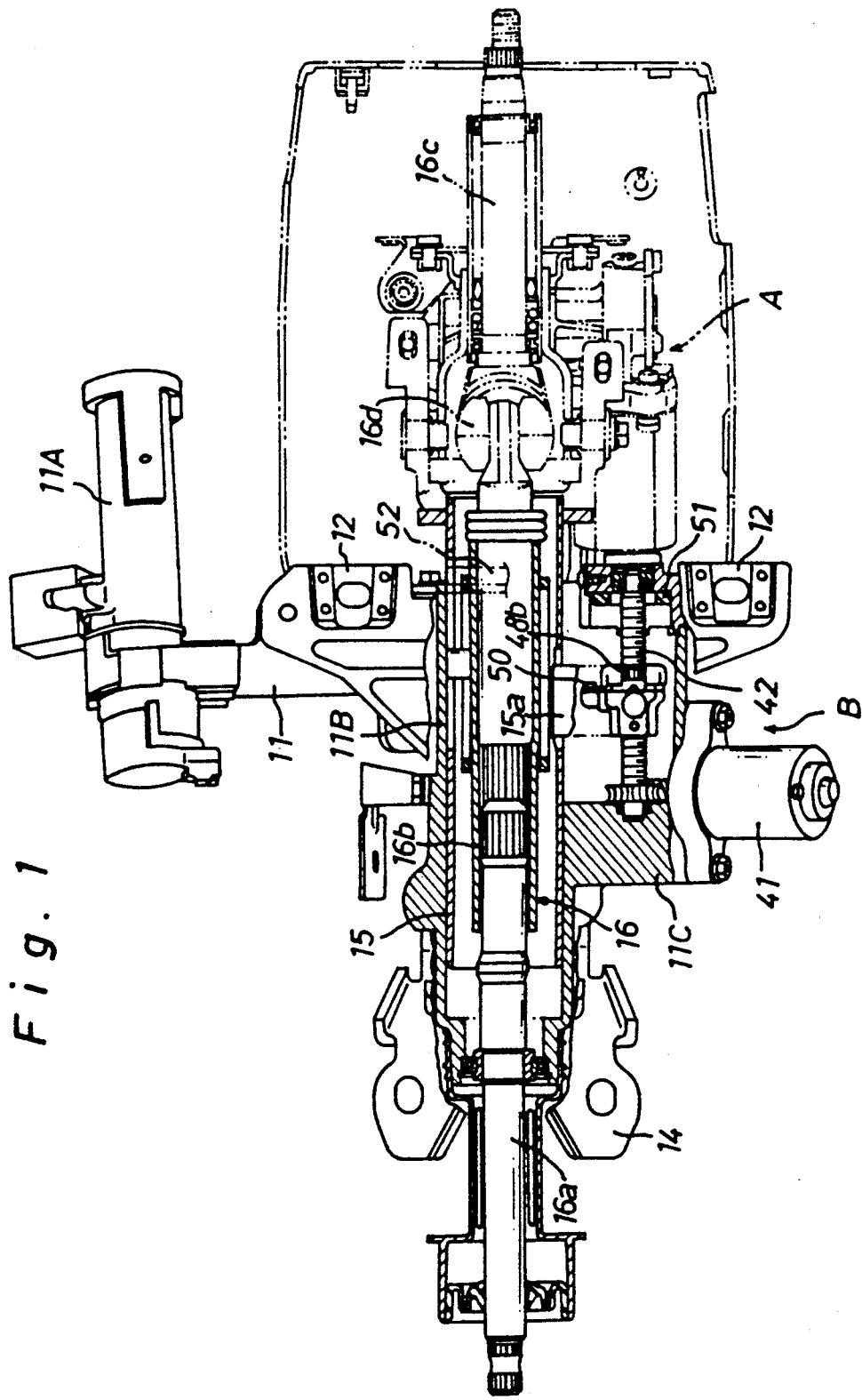
FIG. 1 is a partly broken sectional plan view of a tiltable steering mechanism in combination with a telescopically adjustable steering column mechanism of the motor drive type equipped with a screw-nut feed mechanism according to the present invention.
Figure 2:
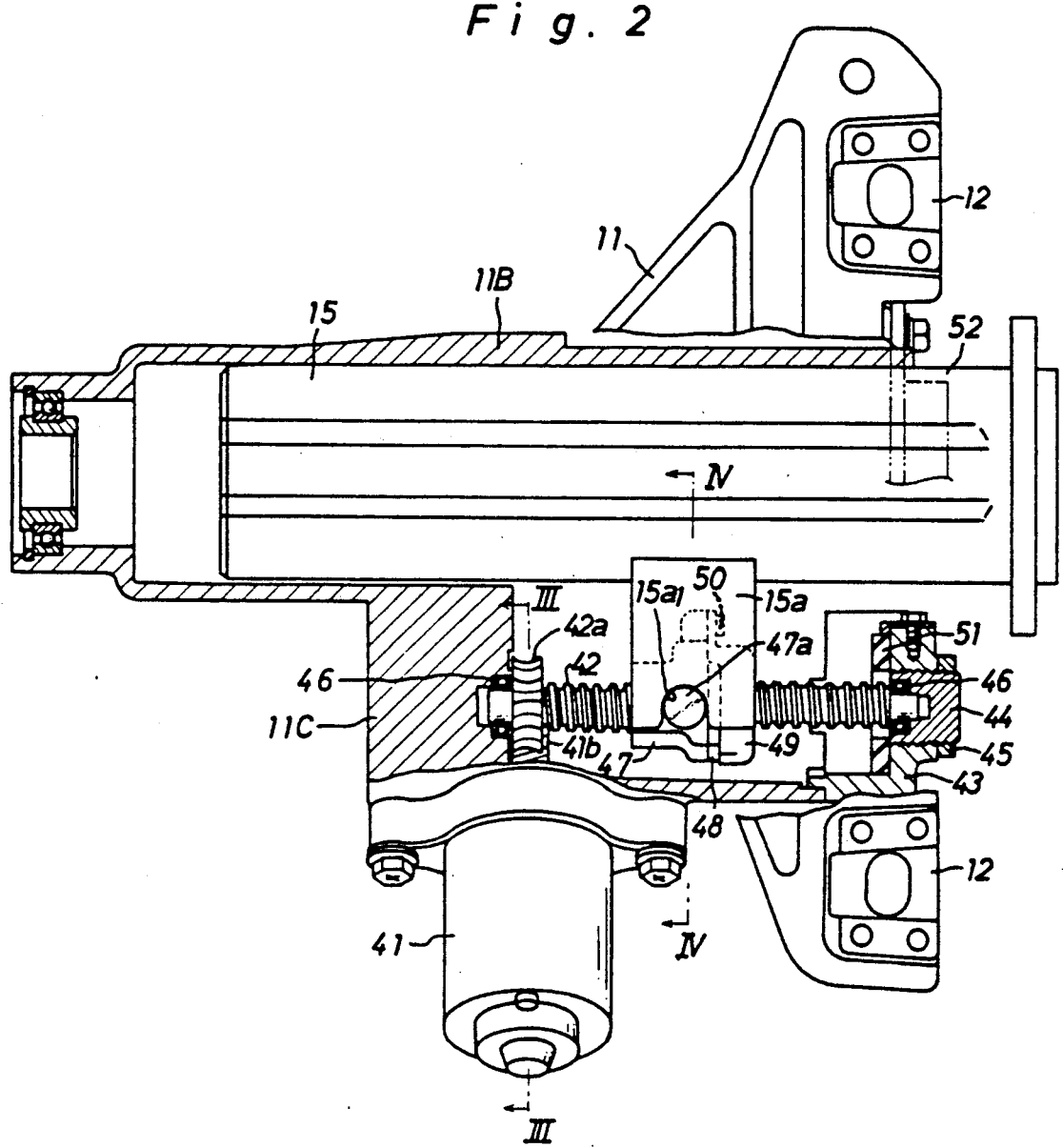
FIG. 2 is an enlarged sectional plan view of the screw-nut feed mechanism shown in FIG. 1.
Figure 2A:
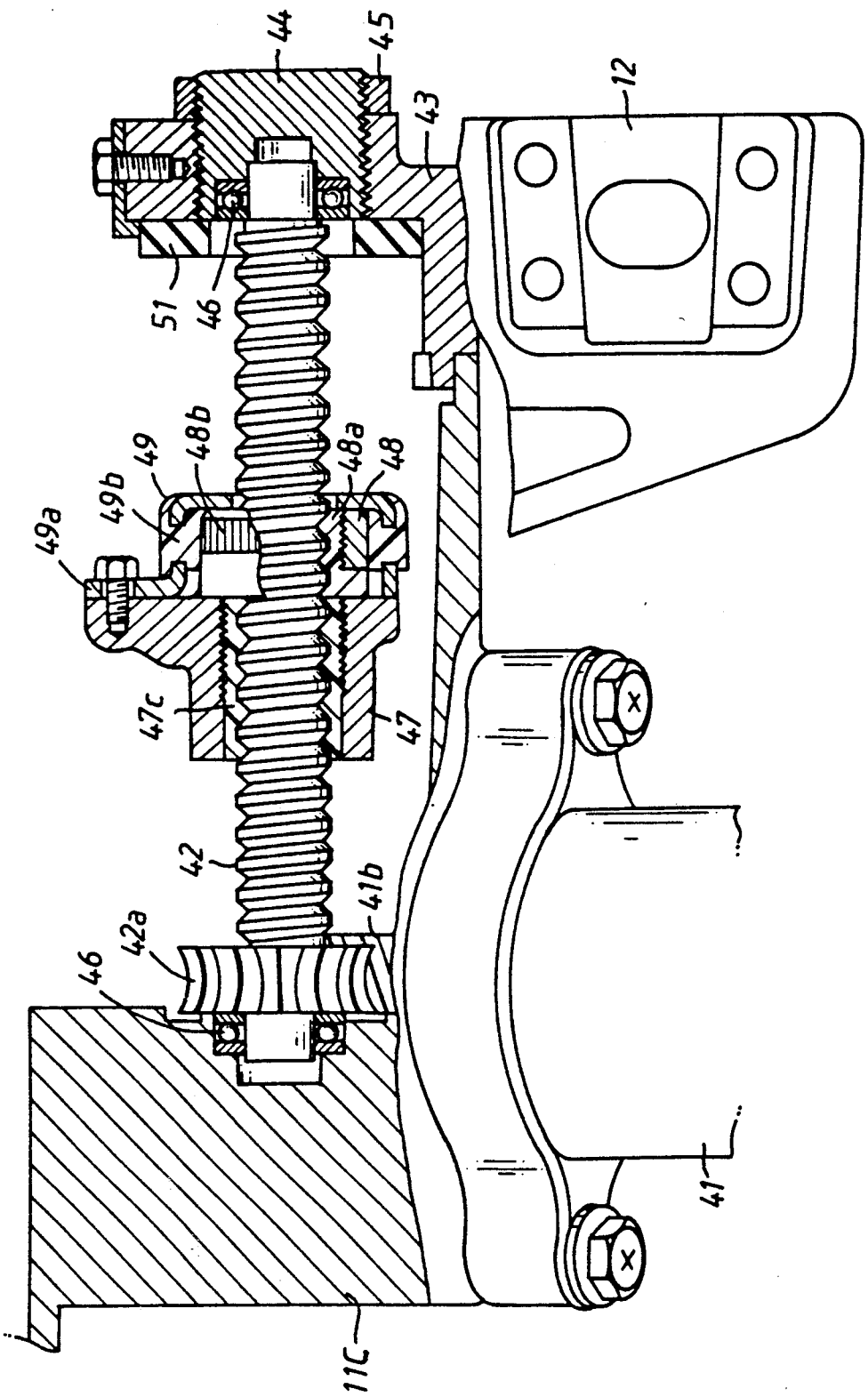
FIG. 2a is a more enlarged view of the mechanism.

In FIGS. 1 and 2 of the drawings there is illustrated a tilatable steering mechanism A in combination with a telescopically adjustable steering column mechanism B of the motor drive type which is equipped with a screw-nut feed mechanism in accordance with the present invention. As shown in FIG. 1, a breakaway bracket 11 is mounted at its upper end to a vehicle body structure (not shown) by means of a pair of spaced breakable capsules 12, 12 to be displaced forwardly when applied with an impact in the occurrence of a collision of the vehicle. The breakaway bracket 11 is mounted at its lower end to the vehicle body structure by means of a bending bracket 14 for absorbing the forward impact energy applied thereto.

The breakaway bracket 11 is integrally provided thereon with a key cylinder 11A, a stationary column tube 11B and a box section 11C. The stationary column tube 11B carries a movable column tube 15 axially slidably disposed therein, and the box section 11C carries an electric motor 41 mounted thereon and a feed screw shaft 42 rotatably mounted therein. Disposed within the movable column tube 15 is a telescopic steering shaft assembly 16 which includes a first shaft 16a rotatably carried on a lower portion of stationary bracket 11B, a second shaft 16b axially slidably coupled with the upper end of first shaft 16a by means of a spline connection for rotation therewith, and a third shaft 16c connected to the upper end of second shaft 16b by means of a universal joint 16d. In addition, the third shaft 16c has an upper end for supporting thereon a steering wheel (not shown).

Figure 3:
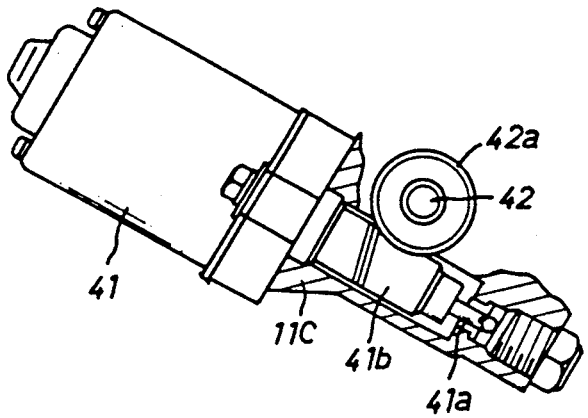
FIG. 3 is a sectional view taken along line III—III in FIG. 2.
Figure 4:
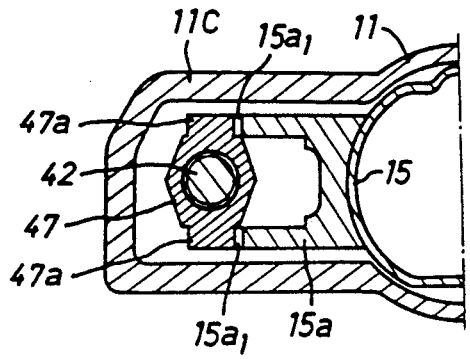
FIG. 4 is a sectional view taken along line IV—IV in FIG. 2.
Figure 5:
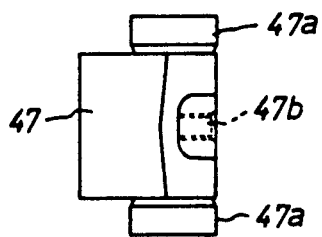
FIG. 5 is an enlarged elevation of a nut or slider shown in FIG. 2.

As shown clearly in FIGS. 2 and 3, the electric motor 41 has an output shaft 41a provided thereon with a worm 41b for rotation therewith, while the feed screw shaft 42 is integrally provided thereon with a worm-wheel 42a in mesh with the worm 41b. The feed screw shaft 42 is arranged in parallel with the movable column tube 15 and supported in place by means of a pair of axially spaced thrust bearings 46. The left-hand thrust bearing 46 is carried on a side wall of box section 11C, while the right hand thrust bearing 46 is carried on a holder 44 which is threaded into a cover member 43 and fixed in place by means of a lock nut 45. The cover member 43 is integrally assembled with the box section 11C. The screw-nut feed mechanism of the present invention includes a slider or nut 47, a lock nut 48 and a support 49 provided on the feed screw shaft 42 in such a manner as will be described in detail hereinafter.

Figure 6:
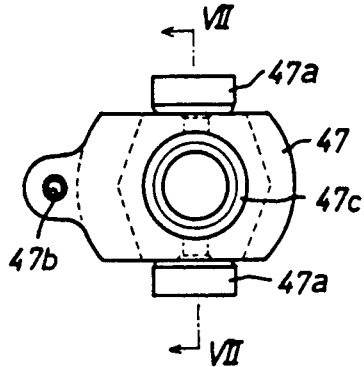
FIG. 6 is a side view of the nut or slider shown in FIG. 5.
Figure 7:
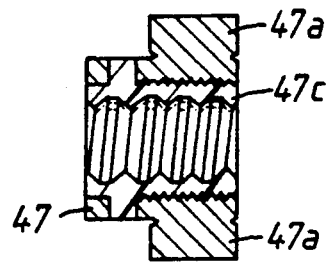
FIG. 7 is a cross-sectional view taken along line VII—VII in FIG. 6.

As shown clearly in FIGS. 2 and 4-7, the slider 47 has a pair of pin portions 47a and a mounting hole 47b for attachment with the support 49. The pin portions 47a of slider 47 are engaged with a pair of vertically spaced recesses 15a₁ of an arm 15a secured to the movable column tube 15. (see FIG. 4) As shown in FIGS. 6 and 7, the slider 47 is molded with synthetic resin to form internal female threads 47c in engagement with the external male threads of feed screw shaft 42. Thus, the slider 47 is axially displaced by rotation of the feed screw shaft 42 to cause axial movement of the movable column tube 15. As shown in FIGS. 1 and 2, stoppers 51 and 52 are mounted to the stationary column tube 11b for abutment with the movable column tube 15.

Figure 8:
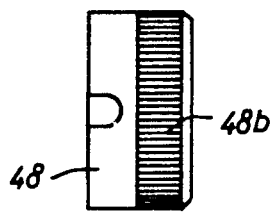
FIG. 8 is an enlarged elevation of a lock nut shown in FIG. 2.
Figure 9:
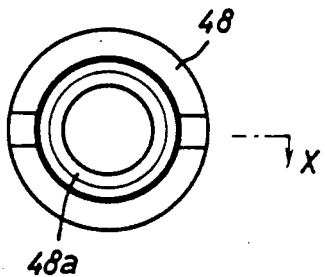
FIG. 9 is a side view of the lock nut shown in FIG. 8.
Figure 10:
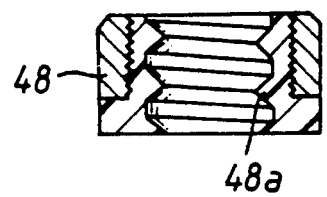
FIG. 10 is a cross-sectional view taken along line X—X in FIG. 9.

As shown clearly in FIGS. 8-10, the lock nut 48 is molded with synthetic resin to form internal female threads 48a in engagement with the external male threads of feed screw shaft 42. The lock nut 48 is formed at its outer periphery with serration 48b. The lock nut 48 is fastened to the slider 47 in such a manner that the feed screw shaft 42 is applied with a pre-load in an axial direction to eliminate all of the clearance space between the threads of screw 42 and slider 47 for smooth rotation.

As shown clearly in FIGS. 1, 2 and 11-14, the support 49 is in the form of a metallic plate 49a which is partly molded with synthetic resin to receive therein the lock nut 48. The support 49 has a flange formed with a mounting hole 49c for attachment with the slider 47 and a molded portion 49b for engagement with the serration 48b of lock nut 48. Thus, the support 49 is coupled with the lock nut 48 at its molded portion 49b and fastened to the slider 47 by means of a screw 50 threaded into the mounting hole 47b of slider 47 through the mounting hole 49c of support 49.

In the screw-nut feed mechanism described above, the pre-load applied to the feed screw shaft 42 in the axial direction can be easily adjusted by the fastening amount of lock nut 48 to eliminate all of the clearance space between the threads of slider 47 and feed screw shaft 42, and the connection of slider 47 and lock nut 48 can be retained by the support 49 in a reliable manner to maintain the pre-load in the adjusted value for a long period of time. As is understood from the above description, the screw-nut feed mechanism can be provided in a simple construction at a low production cost and assembled in a simple manner.

Figure 15:
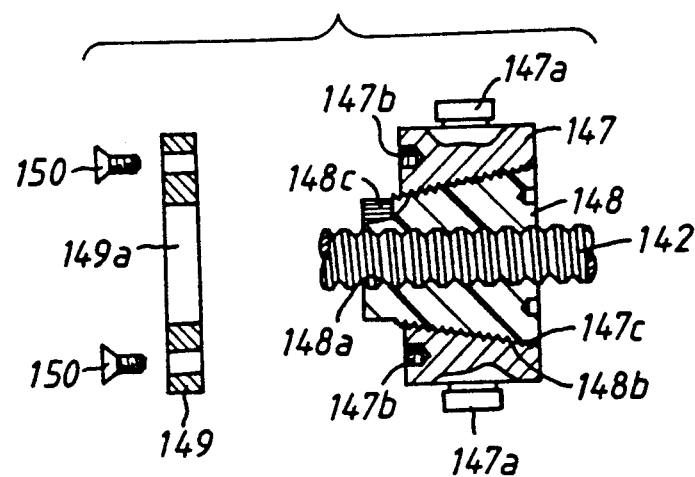
FIG. 15 is a sectional view of a modification of the screw-nut feed mechanism shown in FIG. 2.
Figure 12:
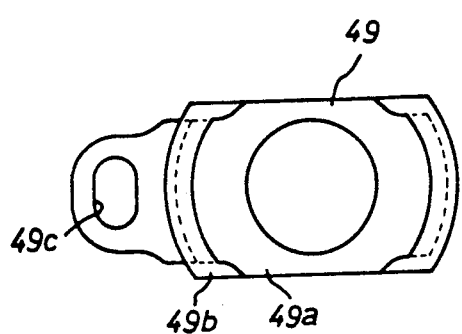
FIG. 12 is a right side view of the support shown in FIG. 11.
Figure 11:
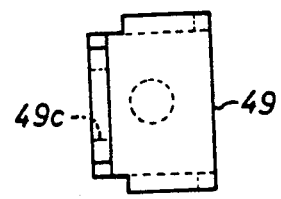
FIG. 11 is an enlarged elevation of a support shown in FIG. 2.
Figure 13:
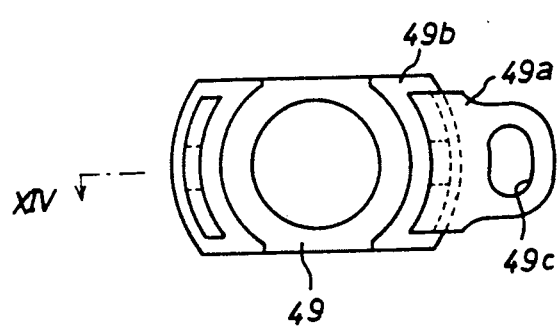
FIG. 13 is a left side view of the support shown in FIG. 11.
Figure 14:
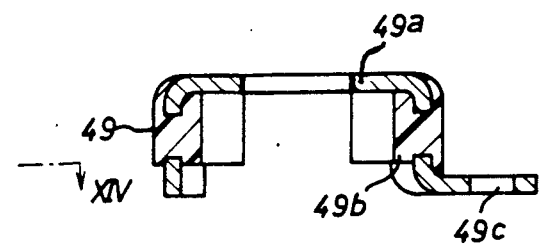
FIG. 14 is a cross-sectional view taken along line XIV—XIV in FIG. 13.

In FIG. 15 there is illustrated a modification of the screw-nut feed mechanism which includes a slider or nut 147, a tapered lock nut 148 and a support 149 provided on a feed screw shaft 142. The feed screw shaft 142 is arranged in the same manner as the feed screw shaft 42 shown in FIGS. 1 and 2. The slider 147 is formed with a pair of vertically spaced pin portions 147a and a mounting hole 147b for attachment with the support 149. The slider 147 has a tapered bore formed with internal female threads 147c for engagement with external male threads 148b of the tapered lock nut 148. Thus, the slider 147 is engaged at its pin portions 147a with the recesses 15a₁ of arm 15a shown in FIGS. 2 and 4 and is threadedly coupled with the lock nut 148.

The tapered lock nut 148 is made of synthetic resin to have a C-letter shaped cross-section. The lock nut 148 has internal female threads 148a in engagement with the external male threads of feed screw shaft 142 and the external male threads 148b in engagement with the internal female threads 147c of slider 147 and has one end formed with serration 148c for attachment with the support 149. The lock nut 148 is fastened to the slider 147 in such a manner that the feed screw shaft 142 is applied with a pre-load in a radial direction to eliminate all of the clearance space between the threads of screw 142 and lock nut 148 for smooth rotation. The support 149 has a bore 149a for receiving therein the serrated end 148c of lock nut 148 and is formed with a pair of mounting holes for attachment with the slider 147. Thus, the support 149 is coupled with the serrated end 148c of lock nut 148 and fastened to the slider 147 by means of screws 150 threaded therethrough into the mounting holes 147b of slider 147 to retain the connection of slider 147 and lock nut 148.

In the modified screw-nut feed mechanism, the pre-load applied to the feed screw shaft 142 in the radial direction can be easily adjusted by the fastening amount of lock nut 148 to eliminate all of the clearance space between the threads of lock nut 148 and feed screw shaft 142, and the connection of slider 147 and lock nut 148 can be retained by the support 149 in a reliable manner to maintain the pre-load in the adjusted value for a long period of time. As is understood from the above description, the modified screw-nut feed mechanism can be provided in a simple construction at a low production cost and assembled small in axial size.

What is claimed is:

1. A screw-nut feed mechanism for effecting axial displacement of a movable member on a stationary member in accordance with rotation of a feed screw shaft mounted on the stationary member, comprising:
- a slider threadedly mounted on said feed screw shaft and being connected to said movable member for axial movement therewith, said slider being molded of synthetic resin and having internal female threads therein which are in engagement with external male threads of said feed screw shaft;
- a lock nut threadedly mounted on said feed screw shaft, said lock nut being molded of synthetic resin to form internal female threads therein which are in engagement with the external male threads of said feed screw shaft, said lock nut being fastened to said slider in such a manner as to apply a pre-load to said feed screw shaft in an axial direction to minimize clearance space between said threads of said feed screw shaft and said threads of said slider; and
- a support coupled with said lock nut having an interior position which is formed to receive said lock nut therein, and being fastened to said slider to retain engagement of said slider and said lock nut.

2. A screw-nut feed mechanism as claimed in claim 1, where said lock nut is formed at its outer periphery with serrations, and said support is partly molded with synthetic resin for engagement with the serration of said lock nut to restrict rotation of said lock nut relative to said slider.

3. A mechanism as claimed in claim 1 wherein said movable member is part of an adjustable steering column mechanism.

4. A screw-nut feed mechanism as claimed in claim 1, wherein said slider has a pair of pin portions engageable with a pair of vertically spaced recesses of an arm secured to said movable member.

5. A screw-nut feed mechanism as claimed in claim 1, wherein said support has a flange formed with a mounting hole for attachment with said slider.

* * * * *